Aug. 24, 1943.  C. W. PETERSON  2,327,818
ILLUMINATING MEANS FOR ENLARGERS
Filed Dec. 3, 1941

CHARLES W. PETERSON
INVENTOR
BY *Newton M. Perriens*
*J. Griffin Little*
ATTORNEYS Patented Aug. 24, 1943

2,327,818

UNITED STATES PATENT OFFICE 2,327,818

ILLUMINATING MEANS FOR ENLARGERS

Charles W. Peterson, Rochester, N. Y., assignor to Eastman Kodak Company, Rochester, N. Y., a corporation of New Jersey Application December 3, 1941, Serial No. 421,466

7 Claims. (Cl. 88—24)

The present invention relates to photographic enlargers, and more particularly to an illuminating means therefor.

In the general type of enlargers, the negative is positioned below the lamphouse in which an incandescent lamp bulb is mounted to afford the necessary illumination for the negative. With such an arrangement, it has been found that the central part of the negative, being nearer the lower end of bulb than the marginal part thereof, will receive the most light, thus providing an undesirable and uneven illumination of the negative, all of which is well known in the art. In order to prevent this over-illumination of the central area of the negative, the present invention provides an arrangement by which the light rays from this nearest portion of the lamp bulb are blocked off or intercepted so that they do not pass directly to the central section or area of the negative to over-illuminate the latter. Rather the light rays from this nearest portion of the bulb are reflected to the sides of the lamphouse from whence they are redirected or re-reflected to the negative adjacent the margins thereof to provide a uniformly illuminated negative, the advantages of which are obvious. In most enlargers, it may even be desirable to slightly over-illuminate the marginal parts of the negative relative to the central part to correct for angular aperture defects of the enlarger projection lens. This may be provided by the device of the present invention.

The present invention, therefore, has as its principal object, an arrangement by which substantially uniform or slightly brighter marginal illumination is provided for the negative.

A further and more specific object of the invention is the provision of a light blocking member or shield which is positioned below the portion of the lamp bulb nearest the negative to reflect the light rays emitted by this nearest portion to the side walls of the lamphouse from whence the rays are reflected to the negative adjacent the sides or margins thereof to provide a supplemental or additional illumination for the marginal section of the negative.

A still further object of the invention is the provision of a light shield of the class described which is detachably secured to the lamp bulb so as to be dependent therefrom.

Another object of the invention is the provision of a light shield which is simple in construction, inexpensive to manufacture, easy to apply and remove, adapted for use with existing enlargers, and highly effective in use.

To these and other ends, the invention resides in certain improvements and combinations of parts, all as will be hereinafter more fully described, the novel features being pointed out in the claims at the end of the specification.

In the drawing.

Similar reference numerals throughout the various views indicate the same parts.

Figure 1:
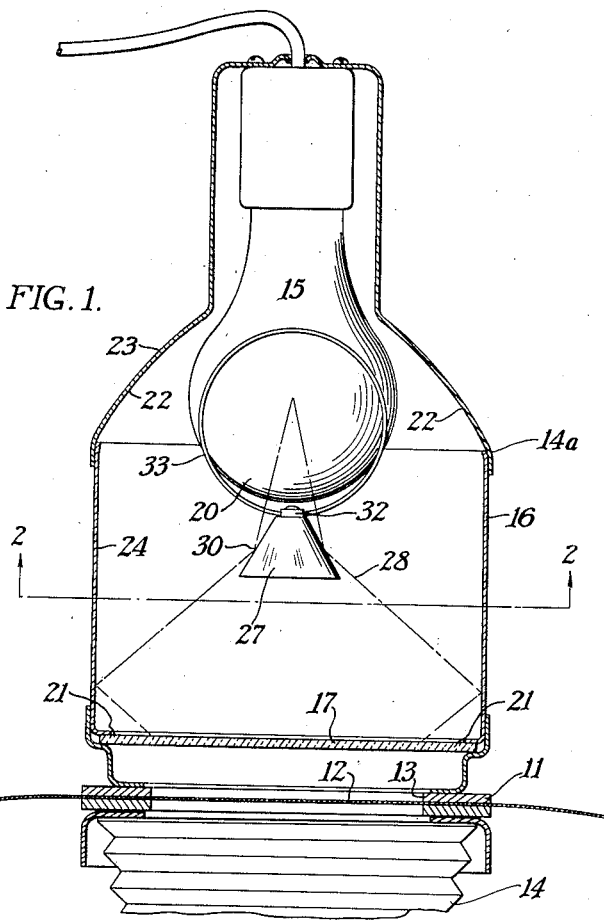
Fig. 1 is a vertical sectional view through a portion of a photographic enlarger, showing the relation thereto of the light blocking member or shield constructed in accordance with the present invention.

The enlarger shown in the drawing may be of any standard and well-known construction, and does not per se constitute a part of the present invention. This enlarger comprises broadly, a negative holder 11 in which a negative 12 is adapted to be positioned and held for projection. The holder 11 is formed with an aperture 13 which frames the image area of the negative 12, as is well known. A bellows 14, of well-known construction, connects the negative holder 11 with the lens board, not shown. The lamphouse, generally indicated by the numeral 14a, extends upwardly from the negative holder 11, and has mounted therein a light source 15, preferably in the form of an opal electric light bulb, of well-known construction, which provides the necessary illumination for the negative 12. The depending side walls 16 of the lamphouse 14a have mounted in the lower end thereof a light diffusing member in the form of an opal diffusing glass screen 17. As the above briefly described enlarger is of a standard and well-known construction, and does not per se constitute a part of the present invention, further detailed description is not deemed necessary for those in the art to fully understand the present invention.

As will be readily apparent from an inspection of Fig. 1 of the drawings, a lamp bulb arranged in the manner shown, which is common practice in enlargers, will have a lower central portion 20 which is positioned nearer the member 17, particularly the center thereof, than the remainder of the bulb. Due to this arrangement and the fact that light intensity varies as the square of the distance, the central section or area of the member 17 will receive more direct light than the balance of the member, and will, therefore, be over-illuminated to produce the well known and undesirable central "bright" spot. The presence of this "bright" spot on the member 17 will prevent the desired even illumination on the negative 12. In order to prevent this "bright" spot or over-illumination of the center of the member 17, and hence the negative 12, the present invention provides a simple and effective means by which light rays from the portion 20 are blocked off or intercepted so that they cannot pass directly to the center of the member 17 to provide the undesired "bright" spot. These blocked off rays are then reflected to a second reflecting surface, to be later described, which, in turn re-reflect or direct the reflected central rays to the member 17 adjacent the edges 21 thereof, as shown in Fig. 1 to provide a supplemental illumination for the member 17 adjacent the edges thereof so as to secure the desired uniform illumination thereof, all of which will be later more fully described. The direct rays from the remaining portions of the bulb 15 may, of course, pass directly to the member 17 to assist in the illumination thereof, as will be apparent from an inspection of Fig. 1. Further illumination of the member 17 is also secured from the light rays reflected from the inner surface 22 of the upper portion 23 of the lamphouse, and also from the inner surfaces 24 of the sides 16. Thus the member 17 is illuminated partly by direct light rays from the lamp 15 partly by reflected light rays therefrom.

Figure 3:
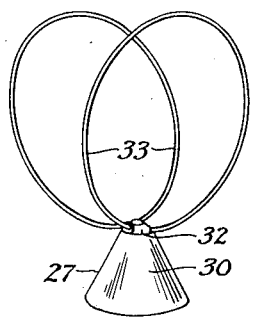
Fig. 3 is a view of the light shield or blocking member of the present invention detached from the lamp bulb.

The light blocking member or shield of the present invention is best shown in Fig. 3, and comprises a substantially cone-shaped member 27 which is adapted to be positioned immediately below the bulb 15 and in the path of the light rays emitted by the portion 20, as shown in Fig. 1. In this position, the shield 27 serves to block off or intercept the central light rays, diagrammatically illustrated by the broken lines 28, to prevent the direct passage of the latter to the central portion of the member 17 to over-illuminate the latter, as pointed out above. These blocked off light rays are not, however, lost to the enlarger, but rather are reflected, in a manner to be later described, to the member 17 adjacent the edges 21 thereof to supplement the direct illumination at this point to thus provide the desired even illumination of the member 17, and hence the negative 12.

To this end, the outer surface 30 of the shield 27 is positioned in the path of the rays 28 and is adapted to reflect the latter laterally toward the sides 16 and downwardly toward the member 17, as clearly shown in Fig. 1. A second reflecting surface, in the present instance the inner surfaces 24 of the walls 16, is positioned in the path of the reflected rays 28 and serves to re-reflect or redirect these rays onto the member 17 adjacent the edges 21, as clearly illustrated in Fig. 1, to supplement or increase the illumination at the marginal portions of the member 17. While the surfaces 24 are preferably utilized as the second reflecting member, it is apparent that separate reflecting members may be used without departing from the invention. Thus by blocking off or intercepting the direct light rays emitted by the portion 20, and in directing these rays, by reflection, to the marginal portions of the member 17, the latter may be evenly illuminated, the advantages of which are apparent.

Figure 2:
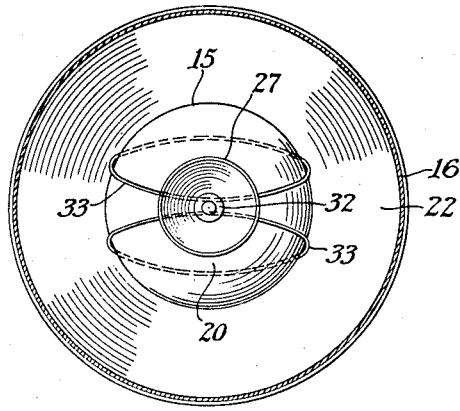
Fig. 2 is a bottom view of the lamp bulb and a portion of the lamphouse, and taken substantially on line 2—2 of Fig. 1, showing the relation of the shield to the lamp bulb and the arrangement for detachably securing the shield thereto.

The shield 27 may be permanently mounted in the lamphouse in the position shown in Fig. 1. However, in order to facilitate removal of the lamp bulb 15 and for other apparent reasons, the shield 27 is preferably movably positioned in the lamphouse. To secure this result, the apex of the shield is provided with a cap 32 formed with a pair of holes, not shown, adapted to receive a pair of spring wire hoops 33 which are adapted to frictionally engage the outer surface of the bulb 15, as shown in Figs. 1 and 2, to detachably secure the shield 27 thereto and in depending relation therewith. By means of this arrangement, the shield may be easily and quickly attached to the bulb 15 and in depending relation therewith; and, when so attached, is retained in operative position, yet may be readily and easily removed from the bulb when so desired. This shield or blocking member 27 thus provides a simple and effective means which not only blocks off or intercepts the direct light rays emitted by the portion 20 of the lamp to thus effectively prevent these rays from passing directly to the central part or area of the member 17 to over-illuminate said central area; but also serves to reflect these direct rays to the sides 16 from which they are redirected to the member 17 to provide further or supplementary illumination for the marginal portions of the member 17 to provide a substantial and uniform illumination thereof, the advantages of which will be readily apparent to those in the art.

While one embodiment of the invention has been disclosed, it is to be understood that the inventive idea may be carried out in a number of ways. This application is, therefore, not to be limited to the precise details described, but is intended to cover all variations and modifications falling within the scope of the appended claims.

I claim:

1. In a photographic enlarger, the combination with a negative positioned in said enlarger, a diffusing light bulb for illuminating said negative and having a central portion which is nearer an area of said negative than the remainder of said bulb, a lamp house for said bulb, of a blocking member smaller than the diameter of said lamp and positioned in said lamphouse directly below said portion to intercept the direct light rays from said portion only to prevent said direct rays from passing directly to said area, means on said blocking member for reflecting said rays in a direction toward said negative, and a second reflector positioned to receive said reflected rays and to reflect the latter to said negative adjacent the edges thereof to provide uniform illumination thereof.

2. In a photographic enlarger, the combination with a negative arranged in said enlarger, a diffusing light bulb having a central portion positioned closer to the central area of the negative than the remainder of the bulb, a lamphouse for said bulb, of a blocking member supported by and depending from said bulb and of a diameter smaller than the latter and positioned to intercept the direct light rays emitted by said portion only, a reflecting surface on said blocking member arranged to reflect the direct rays from said portion only toward the sides of said lamphouse, and reflecting means positioned adjacent the edges of said negative and arranged to receive said reflected rays and to direct the latter to the negative adjacent said edges.

3. In a photographic enlarger, the combination with a negative arranged in said enlarger, a diffusing light bulb having a lower central portion positioned closer to a central area of said negative than the remainder of the bulb, a lamphouse for said bulb, of a blocking member supported entirely by and depending from said bulb and smaller than the latter and positioned to intercept the direct light rays emitted by said portion only, a reflecting surface on said blocking member arranged to reflect said direct rays from said portion only laterally toward said lamphouse and in a direction toward said negative, and means associated with said lamphouse for receiving said reflected rays and redirecting the latter toward the edges of said negative.

4. In a photographic enlarger, the combination with a negative arranged in said enlarger, a diffusing light bulb having a lower central portion positioned closer to the center of said negative than the remainder of the bulb, a lamphouse for said bulb, of a blocking member positioned below and adjacent said portion to intercept the direct rays emitted by said portion only to prevent the direct passage of said rays from said portion to the center of said negative, an inclined reflecting surface on said member adapted to reflect said direct rays, a second reflecting member positioned adjacent the edges of said negative and arranged to receive said reflected rays and to direct the latter to said negative adjacent the edges thereof, and means for detachably mounting said blocking member directly on said bulb and in suspended relation thereon.

5. In a photographic enlarger, the combination with a negative arranged in said enlarger, a diffusing light bulb having a lower central portion positioned closest to said negative, a lamphouse for said bulb, of a blocking member depending from said bulb and positioned to intercept the direct light rays emitted by said portion, a pair of wire hoops secured to said member and engaging said bulb to detachably secure said member directly thereto and below said portion, a tapered surface on said member arranged to receive and reflect said direct rays, and side walls on said lamp house positioned adjacent the edges of said negative to receive said reflected rays and to re-reflect the latter to said negative adjacent said edges.

6. In a photographic enlarger, the combination with a negative positioned in said enlarger, a diffusing light bulb for illuminating said negative and having a portion positioned closer to the center of said negative than the remainder of said bulb, a lamphouse for said bulb, of a blocking member positioned below said bulb and arranged relative thereto to permit the direct rays from the remainder of said bulb to pass directly to said negative but to intercept the direct rays from said portion, an inclined reflecting surface on said blocking member adapted to laterally reflect said intercepted rays, means adjacent the edges of said negative adapted to receive said reflected rays and to redirect the latter to said negative adjacent the edges thereof, and means for mounting said blocking member directly on said bulb and below said portion.

7. In a photographic enlarger, the combination with a negative positioned in said enlarger, a lamphouse arranged above said negative, an opal light bulb mounted in said lamphouse and having a lower central portion arranged above and closer to the central area of said negative than the remainder of said bulb, said lamphouse having depending side walls with inner non-diffusing surfaces, a diffusing glass screen carried by the lower ends of said side walls and positioned between said bulb and said negative, of a conical shaped member mounted on and depending from said bulb and positioned to intercept the direct light rays emitted by said portion, an outer reflecting surface on said member arranged to reflect said direct light rays laterally toward said surfaces and downwardly toward said glass screen, said latter surfaces then serving to redirect the direct light rays to the edges of said glass screen to insure uniform illumination thereof, and a pair of wire hoops carried by said member and adapted to engage said bulb to detachably secure said member in depending relation thereto and below said portion.

CHARLES W. PETERSON.